(12) United States Patent
Benjamin

(10) Patent No.: US 11,671,405 B2
(45) Date of Patent: *Jun. 6, 2023

(54) DYNAMIC FILTER GENERATION AND DISTRIBUTION WITHIN COMPUTER NETWORKS

(71) Applicant: Level 3 Communications, LLC, Broomfield, CO (US)

(72) Inventor: Michael Benjamin, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,050

(22) Filed: Mar. 4, 2022

(65) Prior Publication Data

US 2022/0191175 A1 Jun. 16, 2022

Related U.S. Application Data

(63) Continuation of application No. 16/682,836, filed on Nov. 13, 2019, now Pat. No. 11,277,384.

(60) Provisional application No. 62/778,130, filed on Dec. 11, 2018.

(51) Int. Cl.
| | |
|---|---|
| *H04L 12/00* | (2006.01) |
| *H04L 9/40* | (2022.01) |
| *H04L 43/028* | (2022.01) |
| *H04L 41/0816* | (2022.01) |
| *H04L 67/10* | (2022.01) |
| *H04L 61/4511* | (2022.01) |
| *H04L 61/5007* | (2022.01) |

(52) U.S. Cl.
CPC ...... *H04L 63/0263* (2013.01); *H04L 41/0816* (2013.01); *H04L 43/028* (2013.01); *H04L 61/4511* (2022.05); *H04L 61/5007* (2022.05); *H04L 63/0236* (2013.01); *H04L 67/10* (2013.01)

(58) Field of Classification Search
CPC ............. H04L 63/0263; H04L 41/0816; H04L 43/028; H04L 61/4511; H04L 61/5007; H04L 63/0236; H04L 67/10; H04L 41/0893; H04L 63/145; H04L 63/1458
USPC ..................... 726/13; 707/754; 709/220, 223
See application file for complete search history.

(56) References Cited

U.S. PATENT DOCUMENTS

| | | | |
|---|---|---|---|
| 9,634,902 B1 * | 4/2017 | McKenna | ................ G06F 16/23 |
| 11,277,384 B2 * | 3/2022 | Benjamin | ........... H04L 61/5007 |
| 2006/0047634 A1 * | 3/2006 | Aaron | .................... G06F 16/335 |
| 2011/0023108 A1 | 1/2011 | Geldermann | |
| 2013/0166576 A1 | 6/2013 | Hudzia | |
| 2015/0124857 A1 | 5/2015 | Young | |
| 2015/0319070 A1 | 11/2015 | Nachum | |

(Continued)

*Primary Examiner* — Frantz Coby

(57) ABSTRACT

Systems and methods for implementing filters within computer networks include obtaining blocklist data that includes blocklist entries for a network. Each of the blocklist entries includes one or more network traffic attributes for identifying traffic to be blocked. In response to receiving the blocklist data, a filter based on a common network traffic attribute shared between at least two of the plurality of blocklist entries is generated. The filter is then deployed to a network device within the network such that the filter may be implemented at the network device to block corresponding traffic.

17 Claims, 3 Drawing Sheets

(56) References Cited

U.S. PATENT DOCUMENTS

2017/0034285 A1    2/2017   Bhandari
2020/0186499 A1    6/2020   Benjamin

* cited by examiner

DYNAMIC FILTER GENERATION AND DISTRIBUTION WITHIN COMPUTER NETWORKS

TECHNICAL FIELD

The present disclosure relates to implementing filters within a network environment and, in particular, to systems and methods for generating and distributing filters to devices within the network environment.

BACKGROUND

Computing devices, including laptops and smartphones, connected to the Internet or other networks are generally confronted by interminable security risks. For example, the Internet is plagued by numerous malicious actors utilizing various forms of malware to damage or disable computing devices or systems, steal data, interrupt communications, extort businesses or individuals, and/or steal money, among other nefarious acts.

Despite the variety of cyberattack methods, there is commonality in that many fundamentally rely on transmitting data over a network. Accordingly, to the extent network traffic associated with malicious activity can be readily identified, such traffic can be rerouted and/or blocked, thereby thwarting or at least mitigating potential harm caused by the malicious activity. To that end, various devices within a network may include hardware- and/or software-based filtering functionality that may be configured to identify traffic having particular characteristics indicative of malicious or otherwise undesirable activity. When the filters identify such traffic, the devices block or quarantine the traffic, mark the traffic for further analysis, or take other similar remedial measures.

It is with these observations in mind, among others, that various aspects of the present disclosure were conceived and developed.

SUMMARY

In one aspect of the present disclosure, a method of implementing filters within a network is provided. The method includes generating a filter from blocklist data. The blocklist data contains a plurality of blocklist entries and each blocklist entry includes network traffic attributes. Generating the filter includes grouping the plurality of blocklist entries into one or more sets according to the network traffic attributes, each set including blocklist entries having at least one common network traffic attribute. Generating the filter further includes generating a filter rule for identifying network traffic having the common network traffic attribute. The method further includes deploying the filter to a network device by implementing the filter rule at the network device.

In another aspect of the present disclosure, a non-transient computer-readable storage medium is provided. The non-transient computer-readable storage medium has instructions embedded thereon that are executable by one or more processors. When executed, the instructions cause the processor to perform a method for implementing filters within a network. The method includes generating a filter from blocklist data. The blocklist data contains a plurality of blocklist entries and each blocklist entry includes network traffic attributes. Generating the filter includes grouping the plurality of blocklist entries sets according to the network traffic attributes such that each set includes blocklist entries having at least one common network traffic attribute. Generating the filter further includes generating a filter rule for identifying network traffic having the common network traffic attribute. The method further includes deploying the filter to a network device by implementing the filter rule at the network device.

In yet another aspect of the present disclosure, a system for implementing filters within computer networks is provided. The system includes one or more hardware processors and a memory storing machine-readable instructions that, when executed by the one or more hardware processors, cause the one or more hardware processors to obtain blocklist data including a plurality of blocklist entries for a network, each of the plurality of blocklist entries including one or more network traffic attributes. The instructions further cause the hardware processors to generate a filter based on a common network traffic attribute shared between at least two of the plurality of blocklist entries and deploy the filter to a network device within the network.

DETAILED DESCRIPTION

Figure 1:
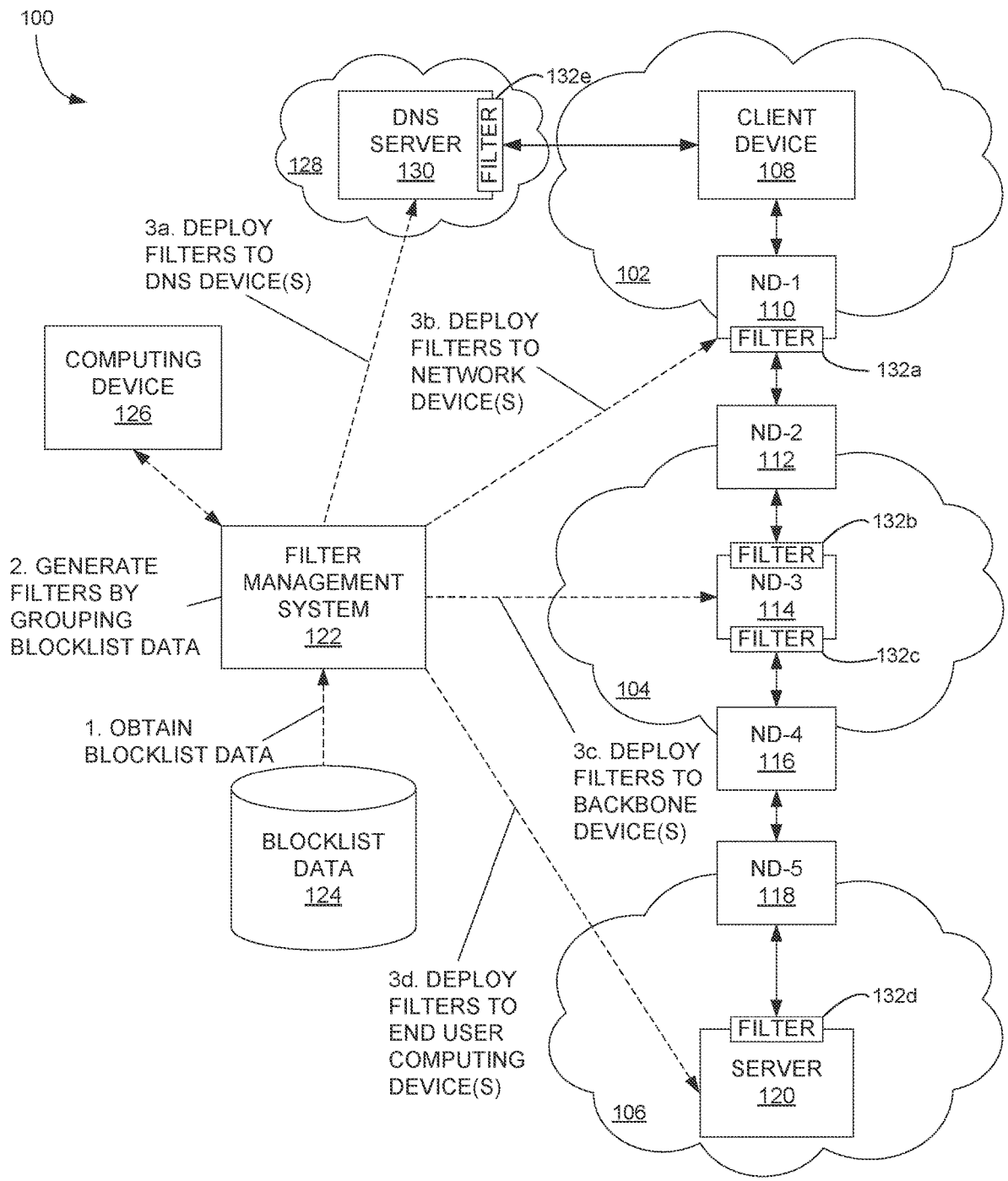
FIG. 1 is an example network environment including a filter management system for generating and updating filters within the network environment.

Telecommunication or other types of computer networks provide for the transmission of information among devices. Such communications may involve voice, data, multimedia information, software (including patches and updates), and various others forms of digital content, and digital services, among many other things. Such networks include servers or other computing and storage resources from which various forms of digital content and network services can be supplied to some device or devices—e.g., a client device. Networks also include a myriad of other devices involved in establishing and maintaining connections and coordinating the flow of data between devices over the network.

Computer networks are frequent targets for a wide range of activity aimed to steal information, disrupt functionality of components within the network, distribute viruses and malware, and any other of a wide range of threats to modern computing systems. In light of such risks, operators of modern networks, users at all points in the chain of communication, and network equipment manufacturers are constantly trying to develop and improve on existing techniques to identify and eliminate malicious traffic within computer networks.

With such a goal in mind, among others, the present disclosure provides systems and methods for generating filters and distributing such filters to devices within a computer network. In general, such systems and methods include a filter management system that uses a collection of identified threats, referred to herein as "blocklist data", to generate a one or more filters that may be implemented in networked devices having filtering functionality. The blocklist data may be regularly updated and filters based on the blocklist data may be regularly regenerated and redistributed, thereby providing improved security within the network.

The filter management system generates the filters by identifying common attributes of entries within the blocklist data such that a single filter or filter rule may be generated that encompasses multiple blocklist entries. In one example, the filter management system may analyze source or destination IP address information maintained in the blocklist data and may identify common data patterns, at the bit, byte, or other delineations, within such IP addresses. The data patterns may then form the basis of a filter generated by the filter management system.

Filters generated by the filter management system may be distributed to a wide range of devices within a network including end user devices, routers, switches, firewalls, intrusion prevention systems, gateways, and other types of network equipment. In certain cases, the filters generated by the filter management system may be implemented as hardware filters. When implemented as hardware filters, additional software filtering functionality by the device may also be implemented to perform deeper analysis of packets/traffic captured by the hardware filter. Such software filtering may also be supported by the filter management system, such as by the filter management system providing portions of the blocklist data to the device.

FIG. 1 is a block diagram of an example network environment 100. The network environment 100 includes a client device 108 in communication with a server 120 via multiple network devices, and, more specifically, network devices ND-1 to ND-5 110-118. As illustrated in FIG. 1, the client device 108 and ND-1 110 are components of a first network 102, ND-2-ND-4 112-116 are components of a second network 104, and ND-5 118 and the server 120 are components of a third network 106.

The network environment 100 is intended merely as an example to illustrate the various concepts of the present disclosure. In other implementations, more or fewer networks or subnetworks may be present with each network or subnetwork including more or fewer network devices than illustrated in FIG. 1. Moreover, the client device 108 and the server 120 are simply provided as examples of computing devices that may communicate over a network. Accordingly, while described herein as a client device 108 and a server 120 for purposes of context, each of the client device 108 and the server 120 may be any suitable computing device.

Each of ND-1 110, ND-3 114, server 120, and DNS server 130 are illustrated as including respective filters 132a-132e. The filters 132a-132e are configured to receive and analyze network traffic (incoming and/or outgoing) and to apply one or more filter rules that determine whether such traffic has one or more attributes. If the traffic does not include the attributes, the traffic is passed through the filter. If, on the other hand, the traffic includes the attributes, additional actions are taken. In certain cases, the traffic may be "sunk" or otherwise blocked. In other cases, the traffic may be passed through one or more additional filters or otherwise analyzed. The particular location of filters 132a-132e is intended merely as illustrative of filtering by network edge devices (e.g., ND-1 110), by network devices of a network backbone (e.g., ND-3 114), by end user computing devices (e.g., server 120), and by DNS components (e.g., DNS server 130). As a result, the particular locations and number of filters illustrated in FIG. 1 should not be seen as limiting. Rather, implementations of the present disclosure may generally include any devices within a network that support filtering functionality and, more specifically, filtering functionality that may be dynamically controlled or modified.

During operation, the client device 108 may communicate with the server 120 by exchanging packets with the server 120. In one example, the client device 108 receives, is provided with, or otherwise obtains a universal resource locator ("url") and submits a domain of the url to a domain name system (DNS) for resolution. Resolution generally involves performing multiple look ups using servers of the DNS (such as DNS server 130) to determine an Internet Protocol (IP) address corresponding to the domain name, which in the current example is the IP address of the server 120. The IP address is then returned to the client device 108 such that the client device 108 may connect to and initiate a communication session with the server 120.

Once a session has been established, packets may be exchanged between the client device 108 and the server 120. In addition to the data being transmitted, such packets may include a header with various pieces of information including, among other things, a source IP address and a destination IP address, the latter of which may be used to route the packet through one or more networks or subnetworks to the server 120.

As illustrated in FIG. 1, multiple network devices may be disposed between the client device 108 and the server 120. Such network devices may include, without limitation, one or more of switches, routers, firewalls, intrusion prevention systems, gateways, or any piece of network equipment, and may provide various functions including, without limitation, routing/forwarding of packets, conversion of packets for transmission between networks using different communication protocols, multiplexing/demultiplexing of data, and the like. One or more of the network devices 110-118, the client 108, the server 120, and components of the DNS 128, such as DNS server 130, may be configured to identify and filter malicious or potentially malicious packets. Such packets may include, among other things, packets associated with a distributed denial-of-service (DDoS) or other attack, or packets originating from a particular geographic region known to be a source of hacking or similar activity. So, for example, a network device may examine various elements of the packet, such as the source and/or destination address, and determine that such elements indicate the packet is associated with or potentially associated with malicious activity. In response, the packet may be "sunk", blocked, or otherwise filtered by the network device such that the malicious activity is mitigated.

Packet filtering may be implemented using either hardware or software and, in certain cases, a given device may implement both hardware- and software-based filtering mechanisms. In general, hardware-based filtering can process packets at a significantly higher rate than software-based filtering but is generally more limited with respect to the number of filtering rules that may be implemented. Conversely, software-based filtering is a slower but more flexible process than hardware-based filtering and, as a result, can be implemented to examine a broader range of packets and/or to examine a wider range of packet characteristics using more sophisticated rule sets.

In implementations of the present disclosure, filtering of malicious packets is facilitated, in part, by a filter management system 122. The filter management system 122 has access to or otherwise communicates with blocklist data 124 that includes listings of IP addresses, IP address ranges, domains, or similar identifiers associated with or suspected of being associated with malicious activity. The blocklist data 124 may be updated over time as new threats are identified and potential threats are determined to be benign. The blocklist data 124 may be updated by an operator of the filter management system 122. In certain implementations, however, at least a portion of the blocklist data 124 may be provided by a third-party, such as a customer for which dynamic filtering services are provided by an operator of the filter management system 122. In such implementations, a computing device 126 may be used by the customer to connect to and provide threat information to or to otherwise interact with the filter management system 122, which may in turn update the blocklist data 124.

During operation, the filter management system 122 processes the information stored in the blocklist data 124 to generate filters for implementation by one or more devices, which may include any of the client device 108, the server 120, or any of the network device 110-118. The filter management system 122 then transmits the generated filters to such devices for implementation by the devices. The filter management system 122 is illustrated as being in communication with each of networks 102-106 and DNS server 130 and is capable of updating hardware and/or software filters of devices within networks 102-106 and DNS 128; however, in other implementations, the filter management system 122 may be configured to communicate with only a subset of networks, subnetworks, or devices within a broader network environment. The filter management system 122 may be configured to directly communicate with components of networks 102-106 and DNS 108 to configure filters of such components or may communicate with one or more intermediate devices which then manage configuration of the component filters.

Processing of the blocklist data 124 by the filter management system 122 may be accomplished using various techniques, however, in general, the processing step includes the generation of one or more filters that may be distributed to and implemented in devices associated with the filter management system 122. More specifically, the filter management system generates one or more filters based on common patterns or common attributes found in entries of the blocklist data 124.

The actual process by which common patterns and/or attributes of the blocklist data entries are identified may vary in applications of the present disclosure. However, in general, any computer-implemented process for grouping data based on common attributes of the data being grouped may be used. So, for example, the filter management system 122 may implement one or more machine learning algorithms for efficiently grouping the data.

In one simple example, suppose the blocklist data 124 includes source IP addresses 1.2.3.4, 1.5.3.6, and 1.2.3.5. Instead of checking each address individually, the filter management system 122 may instead generate a filter that identifies all traffic having a source IP address of 1.x.3.y, where x is any value from 2 to 5 and y is any value from 4 to 6. As a result, each of the three IP addresses would be captured using only a single filter.

In another implementation intended for use in filtering DNS-related traffic, the filter management system 122 may be configured to generate filters based on attributes of DNS requests. In such implementations the blocklist data 124 may include full domain names or portions of domain names (e.g., top-level domains, hostnames, etc.) for which requests are to be denied or otherwise blocked. The filter management system 122 may identify common attributes of the blocklist entries and generate filters to block sets of the blocklist entries, e.g., by identifying domain names (or portions thereof) conforming to a common string pattern. For example, if the blocklist included each of the domain names "fakehost.com", "failhost.com", and "falsehost. com", the filter management system 122 may generate a filter that identifies DNS requests for domain names based on a data pattern that identifies domain names with hostnames beginning with "fa" and ending in "host" within the top level domain ".com" (e.g., "fa*host.com", where * indicates an intermediate string of arbitrary length).

In certain applications, the filters generated by the filter management system 122 from the blocklist data 124 may be a Bloom filter. A Bloom filter is a probabilistic data set that is used to test whether an element is a member of a given set. In the current application, the set in question is the blocklist data 124 (or a subset thereof) while the element or elements in question are properties of a received packet, such as a source IP address and/or a destination IP address. In the case of filtering by the DNS 128, the element may be a domain submitted by the client device 108 to the DNS 128. However, more generally, the element or elements in question may be any attribute associated with a given packet.

The actual attribute on which packets are filtered may vary based on the characteristics of the blocklist data 124 entries and how such entries are grouped. However, in one example, the filter may filter a sequential range of IP addresses that covers a particular subset of the IP addresses included in the blocklist data 124. In another example, the filter may filter based on ranges of IP address octets, such as in the previously discussed example. In still another example, the filter may filter based on specific bits of an IP address (e.g., the filter may be configured to filter out all IP addresses where the third, twelfth, and twenty-eighth bit of the IP address is a "1"). In the case of filtering within DNS 128 and as noted above, filtering may also be performed on the domain name contained in a DNS query. So, for example, filters may be configured to filter out any DNS requests for particular top-level domains (e.g., *.ru) or any domain names containing particular strings, among other things. More generally, however, filtering may be performed on any attributes of network traffic, regardless of the purpose or content of the network traffic.

In light of the foregoing, the filter management system 122 processes the blocklist data 124 to identify common attributes of blocklist data 124 entries. Such common attributes are then used to generate a corresponding filter that filters based on the common attributes. The filters are then distributed to and implemented in devices of the network environment 100.

Filters generated by the filter management system 122 may be deployed to devices of the network environment 100 in various ways. For example and without limitation, deployment may include transmitting a reconfiguration message or similar update to devices implementing filters within the network environment 100. In certain cases, the reconfiguration message or update may instantiate one or more new filters within the device. Alternatively, the reconfiguration message may update or otherwise modify existing filters of the device.

As can be appreciated from the foregoing description, the filters generated by the filter management system 122 may be over-inclusive. In other words, while the filters discussed above will not result in false negatives (i.e., falsely identifying a known threat as benign), the possibility exists for false positives (i.e., falsely identifying a benign packet as a threat). For example, in the previous example source IP address filter of 1.x.3.y, where x is 2 to 5 and y is 4 to 6, a packet having a source IP address of 1.4.3.4 would be captured by the filter even though it is not one of the three known threat source IP addresses from which the filter is derived. While examples herein may use IPv4 addresses, it should be appreciated that implementations of the present disclosure are not limited to IPv4 applications and may be implemented using other addressing schemes including, without limitation, IPv6.

Because of this over-inclusiveness, filters generated by the filter management system 122 may be implemented as the first of multiple filters in a given device and may be used to significantly reduce the number of packets requests for which additional analysis may be required. So, for example, a given filter generated by the filter management system 122 may capture 3% of packets for further processing by a secondary filter, but may allow the remaining 97% of packets to pass. The captured 3% of packets may then be passed through one or more additional filters to further evaluate whether such packets are associated with a threat and should be blocked.

Based on this multi-filter functionality, in certain implementations the first-level filters generated by the filter management system 122 may be implemented as hardware filters while any secondary filters may be implemented in software. As a result, relatively high-speed but general hardware filtering may be leveraged to quickly and efficiently analyze packets received by a device and significantly reduce the number of packets requiring additional analysis. Relatively slower but more sophisticated software filtering may then be performed to more precisely determine whether a packet not captured by the hardware filter should, in fact, be blocked.

In certain implementations, the filter management system 122 may generate multiple sets of filters for use in different parts of a network environment or for implementation in different devices. For example, in one implementation, the filter management system 122 may maintain different sets of blocklist data for different networks or subnetworks (e.g., networks belonging to different customers). Accordingly, the filters generated by the filter management system 122 may vary between the any two networks/subnetworks.

In another example, the blocklist data 124 may include a relative threat-related metric for each entry of the blocklist data 124. So, for example, a known and verified threat may be assigned a score of 1.0 (on a scale of 0 to 1.0) while a suspected but unverified threat may be assigned a lower score, e.g., 0.6. Accordingly, the score may provide a general indication of a confidence level regarding whether the blocklist data entry indicates an actual threat. Different devices, networks, or subnetworks may then be assigned different security thresholds that may then be used by the filter management system 122 to selectively include or exclude blocklist data entries when generating filters for the devices, networks, or subnetworks. For example, the filter management system 122 may be configured to generate filters for a high security subnetwork using all blocklist data having a threat score of 0.5 or greater but to generate filters for a more open subnetwork using only blocklist data having a threat score of 0.8 or greater. As a result, the filters implemented in the high security subnetwork will be significantly more selective and will identify a higher proportion of packets for further analysis as compared to the filters implemented in the more open subnetwork.

As previously noted, the filter management system 122 may generate and update hardware filters of network devices. However, the filter management system 122 may also be used to update, manage, or otherwise facilitate software filters of such network devices. For example, in one implementation, the filter management system 122 may be configured to distribute some or all of the blocklist data 124 to devices for use in performing software filtering. In another implementation, the filter management system 122 may be configured to receive requests from devices to verify whether certain packets marked for software-based filtering should, in fact, be blocked.

In certain implementations, the filter management system 122 may be configured to automatically update filters of devices associated with the filter management system 122. For example, the filter management system 122 may be configured to regenerate filters from the blocklist data 124 and to redistribute such filters at regular intervals (e.g., daily, weekly, monthly, etc.). As another example, the filter management system 122 may be configured to regenerate and redistribute filters in response to a change in the blocklist data 124 or changes in the blocklist data 124 exceeding a particular threshold (e.g., a certain number of new or modified entries). Accordingly, the filter management system 122 may be configured to automatically and dynamically update filters within the network environment 100, thereby ensuring that such filters are implemented based on current threat information. Instead of or in addition to such automated operation, the filter management system 122 may also be manually activated to generate and/or distribute filters at a device-specific level, for all devices within a subnetwork or network, or at any other level.

Figure 2:
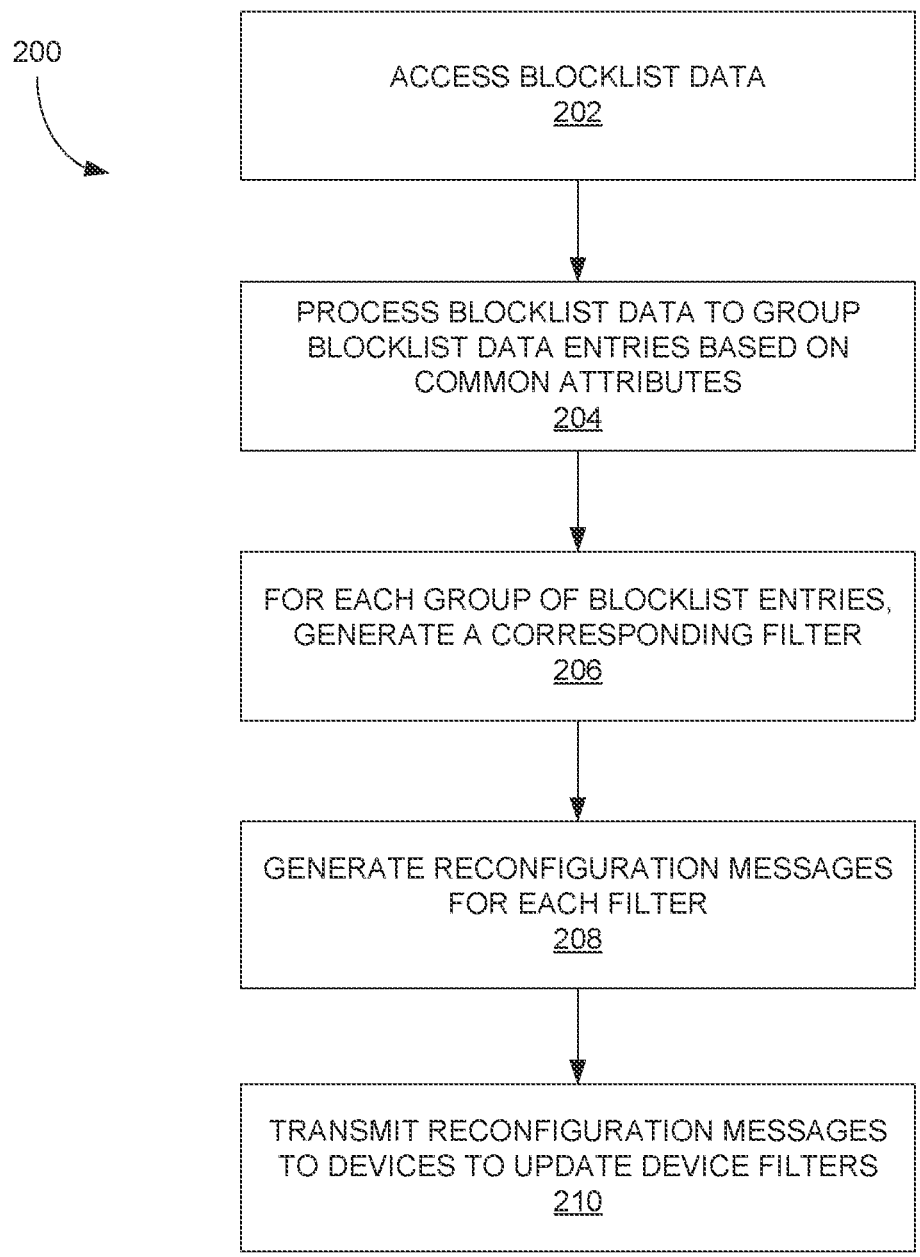
FIG. 2 is a flow chart illustrating a method for generating and distributing filters within a network environment.

FIG. 2 is a flow chart illustrating a method 200 for implementing filters in a network environment. To provide context in the foregoing discussion, reference is made to FIG. 1 and the various elements illustrated in the network environment 100 of FIG. 1. In one implementation, the method 200 may be executed by a computing system, such as the filter management system 122 of FIG. 1.

At operation 202, the filter management system 122 accesses blocklist data 124. As previously discussed in the context of FIG. 1, the blocklist data 124 generally includes information corresponding to known or suspected threats or malicious activity. In one example implementation, the blocklist data 124 may include multiple entries, each entry including information associated with particular traffic to be monitored and/or blocked. The information contained in the blocklist data 124 may be provided from various sources including, without limitation, an operator of the filter management system 122 and customers for which dynamic filtering services are provided using the filter management system 122.

The filter management system 122 then processes the blocklist data 124 to group the entries of the blocklist data 124 based on common attributes (operation 204) and, for each group, generates a corresponding filter (operation 206). More specifically, the filter management system 122 processes the blocklist data 124 to find common attributes shared between multiple entries of the blocklist data 124 such that, for each group of blocklist entries including particular common attributes, a filter may be generated that captures each of the multiple entries within the group. In one example implementation, the one or more filters generated by the filter management system 122 are Bloom filters.

The specific number and scope of the filters generated during operation 204 may vary. For example, the number of filters and, as a result, the number of blocklist data 124 entries captured by each filter may vary based on, among other things, the number of total blocklist data entries, the capacity of devices in which the filters are to be implemented (i.e., certain devices may only be able to implement a limited number of hardware filters), the processing power of such devices available for additional analysis of packets identified by the filter, and risk tolerance, among other things.

In certain implementations, the process of generating filters may take into account other factors and business intelligence information. For example, the filter management system 122 may vary which blocklist data 124 is used to generate the filters based on, among other things, customer preferences, geographic locations, security level requirements, and the like.

At operation 208, the filter management system 122 prepares for distribution/deployment of the filters by generating one or more reconfiguration messages. A reconfiguration message generally includes device parameters, a script, device executable instructions, or the like, that, when received by a given network device, causes the network device to undergo a reconfiguration process. Each reconfiguration message is configured to implement one or more of the filters generated during operation 206 by a recipient device. The reconfiguration messages are then transmitted to respective devices such that the filters may be implemented (operation 210). Once received, the reconfiguration message may be processed by the device to implement the generated filters within the device. For example, the device may read and updated filter parameters included in the reconfiguration message or execute a script included in the reconfiguration message. In other cases, distribution and deployment of the generated filters may include transmitting a specialized file or package executable or deployable by software on the device to install, update, or otherwise modify filter functions of the device to reflect the filters generated by the filter management system 122.

Figure 3:
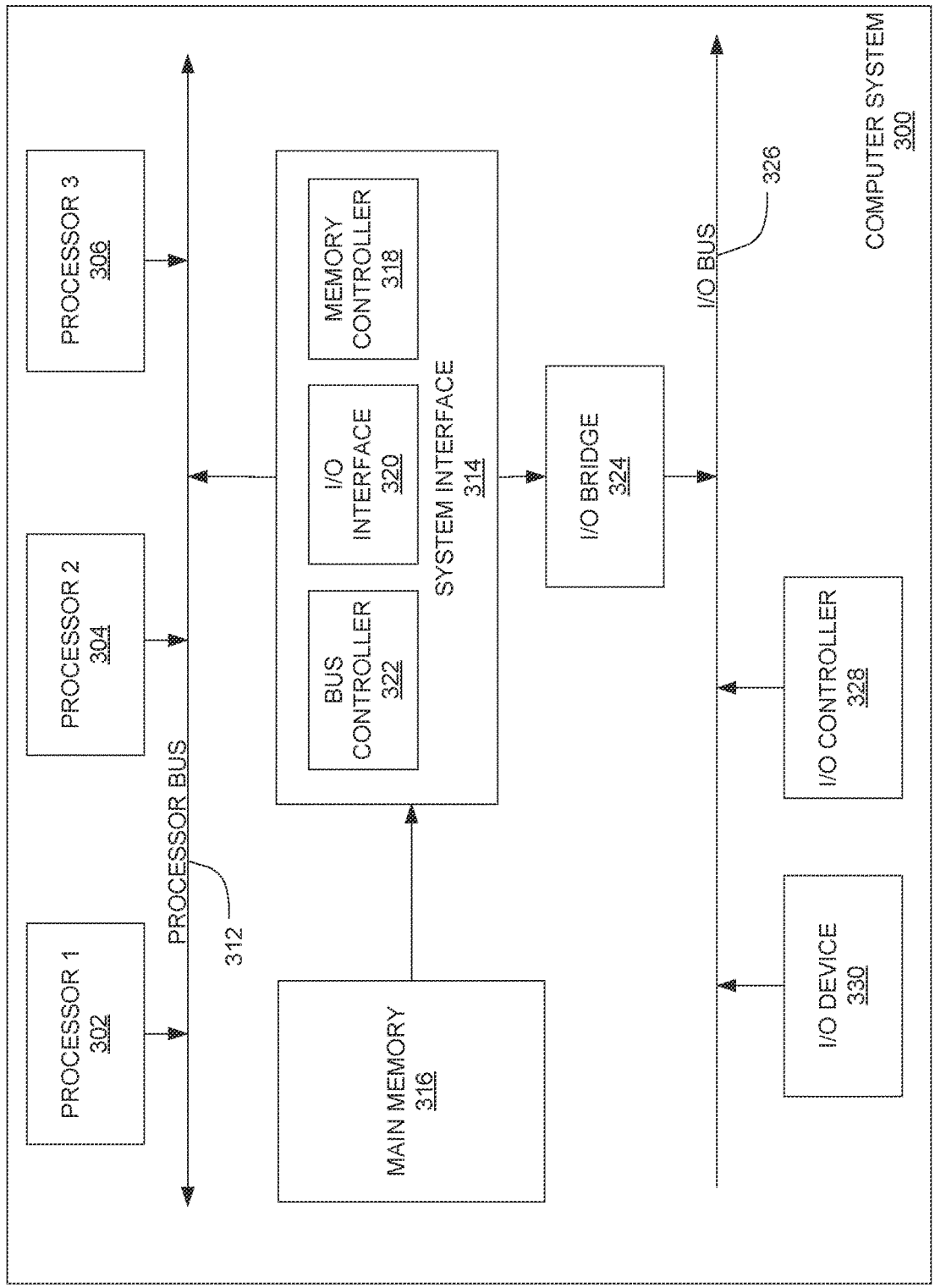
FIG. 3 is a diagram illustrating an example of a computing system which may be used in implementing embodiments of the present disclosure.

FIG. 3 is a block diagram illustrating an example of a computing device or computer system 300 which may be used in implementing the embodiments of the network disclosed above. In particular, the computing device of FIG. 3 is one embodiment of the server or other networking component that performs one of more of the operations described above. The computer system (system) includes one or more processors 302-306. Processors 302-306 may include one or more internal levels of cache (not shown) and a bus controller or bus interface unit to direct interaction with the processor bus 312. Processor bus 312, also known as the host bus or the front side bus, may be used to couple the processors 302-306 with the system interface 314. System interface 314 may be connected to the processor bus 312 to interface other components of the system 300 with the processor bus 312. For example, system interface 314 may include a memory controller 318 for interfacing a main memory 316 with the processor bus 312. The main memory 316 typically includes one or more memory cards and a control circuit (not shown). System interface 314 may also include an input/output (I/O) interface 320 to interface one or more I/O bridges or I/O devices with the processor bus 312. One or more I/O controllers and/or I/O devices may be connected with the I/O bus 326, such as I/O controller 328 and I/O device 330, as illustrated.

I/O device 330 may also include an input device (not shown), such as an alphanumeric input device, including alphanumeric and other keys for communicating information and/or command selections to the processors 302-306. Another type of user input device includes cursor control, such as a mouse, a trackball, or cursor direction keys for communicating direction information and command selections to the processors 302-306 and for controlling cursor movement on the display device.

System 300 may include a dynamic storage device, referred to as main memory 316, or a random access memory (RAM) or other computer-readable devices coupled to the processor bus 312 for storing information and instructions to be executed by the processors 302-306. Main memory 316 also may be used for storing temporary variables or other intermediate information during execution of instructions by the processors 302-306. System 300 may include a read only memory (ROM) and/or other static storage device coupled to the processor bus 312 for storing static information and instructions for the processors 302-306. The system set forth in FIG. 3 is but one possible example of a computer system that may employ or be configured in accordance with aspects of the present disclosure.

According to one embodiment, the above techniques may be performed by computer system 300 in response to processor 304 executing one or more sequences of one or more instructions contained in main memory 316. These instructions may be read into main memory 316 from another machine-readable medium, such as a storage device. Execution of the sequences of instructions contained in main memory 316 may cause processors 302-306 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 316. Common forms of machine-readable media may include, but are not limited to, magnetic storage media; optical storage media (e.g., CD-ROM); magneto-optical storage media; read only memory (ROM); random access memory (RAM); erasable programmable memory (e.g., EPROM and EEPROM); flash memory; or other types of media suitable for storing electronic instructions.

Embodiments of the present disclosure include various operations, which are described in this specification. The operations may be performed by hardware components or may be embodied in machine-executable instructions, which may be used to cause a general-purpose or special-purpose processor programmed with the instructions to perform the operations. Alternatively, the operations may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method of implementing filters within a network, the method comprising:
 generating a filter from blocklist data, the blocklist data containing a plurality of blocklist entries, each blocklist entry having network traffic attributes, wherein generating the filter comprises:
 grouping the plurality of blocklist entries into one or more sets according to the network traffic attributes, wherein each of the one or more sets includes blocklist entries having at least one common network traffic attribute; and for a set of blocklist entries of the one or more sets to be filtered, generating a filter rule for identifying network traffic having the at least one common network traffic attribute of the set to be filtered; and deploying the filter to a network device by implementing the filter rule at the network device, wherein the network device is a component of a Domain Name System (DNS).

2. The method of claim 1, wherein the filter is a Bloom filter generated from the blocklist data.

3. The method of claim 1, wherein the network traffic attributes of each of the plurality of blocklist entries include at least a portion of one of a source address or a destination address.

4. The method of claim 1, wherein generating the filter rule comprises generating a data pattern common to each blocklist entry of the set of blocklist entries to be filtered.

5. The method of claim 1, wherein deploying the filter to the network device comprises implementing the filter rule in hardware of the network device.

6. The method of claim 5 further comprising transmitting at least a portion of the set of blocklist entries corresponding to the set of blocklist entries to be filtered to the network device for implementation in a software filter of the network device.

7. The method of claim 1, wherein:
the network traffic attributes of each of the blocklist entries include at least a portion of a domain name,
grouping the plurality of blocklist entries into one or more sets comprises grouping the plurality of blocklist entries such that the portions of the domain names of the blocklist entries in each of the one or more sets have a common data pattern, and
the filter rule is configured to filter network traffic having domain names including the common data pattern of the set of blocklist entries to be filtered.

8. The method of claim 1, wherein deploying the one or more filters to the network device comprises:
generating a reconfiguration message, the reconfiguration message configured to cause the network device to implement the filter rule in response to receiving the reconfiguration message; and
transmitting the reconfiguration message to the network device.

9. The method of claim 1, wherein the network device is one of a domain name system server, a router, a switch, a firewall, and an intrusion prevention system.

10. A non-transient computer-readable storage medium having instructions embodied thereon, the instructions being executable by one or more processors to perform a method for implementing filters within a network, the method comprising:
generating a filter from blocklist data, the blocklist data containing a plurality of blocklist entries, each blocklist entry having network traffic attributes, wherein generating the filter comprises:
grouping the plurality of blocklist entries into one or more sets according to the network traffic attributes, wherein each of the one or more sets includes blocklist entries sharing at least one common network traffic attribute; and for a set of blocklist entries of the one or more sets to be filtered, generating a filter rule for identifying network traffic having the at least one common network traffic attribute of the set to be filtered; and deploying the filter to a network device by implementing the filter rule at the network device, wherein the network device is a component of a Domain Name System (DNS).

11. The non-transient computer readable storage medium of claim 10, wherein:
the network traffic attributes of each of the blocklist entries include at least a portion of a domain name,
grouping the plurality of blocklist entries into one or more sets comprises grouping the plurality of blocklist entries such that the portions of the domain names of the blocklist entries in each of the one or more sets have a common data pattern, and
the filter rule is configured to filter network traffic having domain names including the common data pattern of the set of blocklist entries to be filtered.

12. The non-transient computer readable storage medium of claim 10, wherein the one or more filters are Bloom filters generated from the blocklist data.

13. The non-transient computer readable storage medium of claim 10, wherein deploying the filter to the network device includes implementing the filter as a hardware filter of the network device and the instructions to further causing the processor to transmit at least a portion of the set of blocklist entries to be filtered to the network device for implementation in a software filter of the network device.

14. A system configured for implementing filters within computer networks, the system comprising:
one or more hardware processors; and
a memory storing machine-readable instructions that, when executed by the one or more hardware processors, cause the one or more hardware processors to:
obtain blocklist data including a plurality of blocklist entries for a network, each of the plurality of blocklist entries including one or more network traffic attributes;
generate a filter based on a common network traffic attribute shared between at least two of the plurality of blocklist entries; and
deploy the filter to a network device within the network, wherein the network device is a component of a Domain Name System (DNS).

15. The system of claim 14, wherein the common network traffic attribute includes at least a portion of a domain name.

16. The system of claim 14, wherein the common network traffic attribute includes at least a portion of one of a source address and a destination address of network traffic.

17. The system of claim 14, wherein the machine-readable instructions cause the one or more hardware processors to:
deploy the filter to the network device for implementation as a hardware filter; and
provide at least a portion of the blocklist data to the network device for implementation as a software filter of the network device.

* * * * *